June 30, 1953
R. MERCER
2,644,041
CYCLIC SWITCHING APPARATUS
Filed Jan. 7, 1949
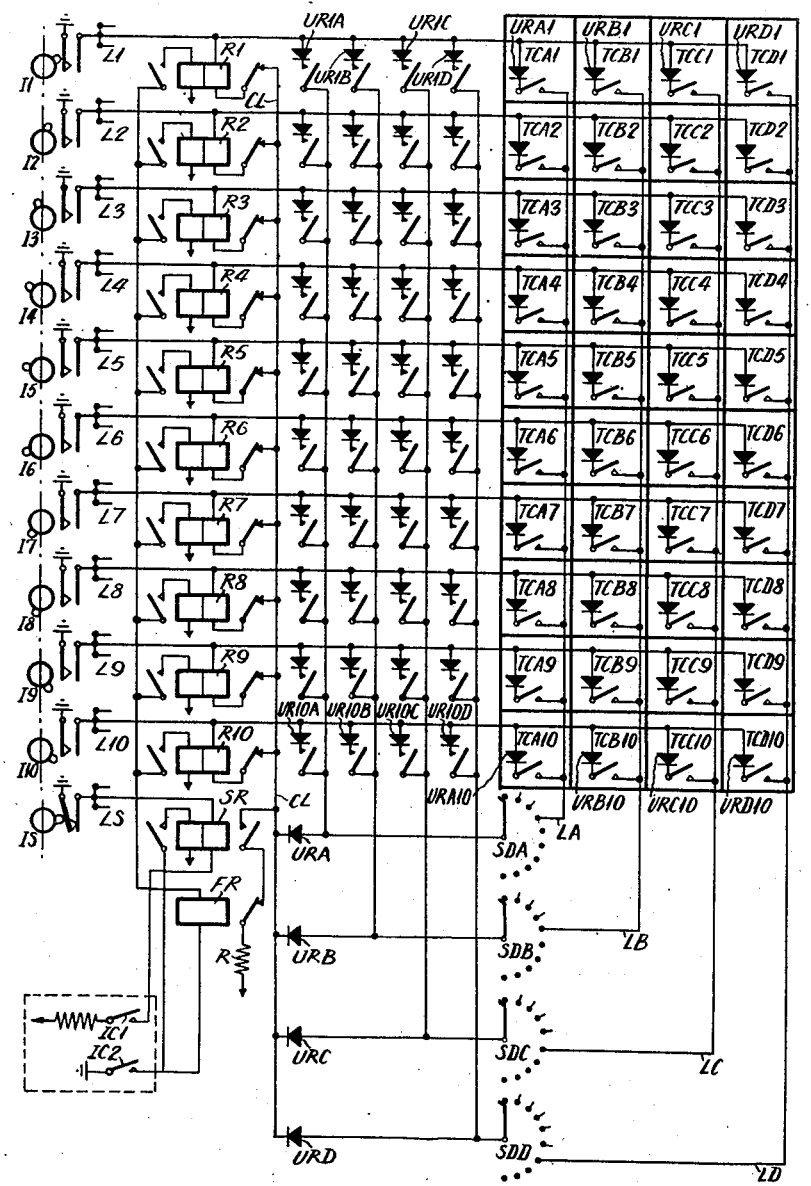
INVENTOR.
RICHARD MERCER.
BY
Donald K. Lippincott
ATTORNEY.

Patented June 30, 1953

2,644,041

UNITED STATES PATENT OFFICE 2,644,041

CYCLIC SWITCHING APPARATUS

Richard Mercer, London, England

Application January 7, 1949, Serial No. 69,719
In Great Britain January 16, 1948

10 Claims. (Cl. 179—18)

The present invention concerns improvements in or relating to telecommunication systems and in particular to telecommunication systems in which multiposition switching devices are used to set up a connection.

The expression "multiposition switching device" as used in this specification means an assembly of contact devices, electronic valves, triggered gas discharge tubes or other devices each individually capable of being selected to set up a connection, the operative elements of such a switching device being either adapted to take up different positions according to the selection to be effected or to be located in different positions to be selectively operated.

One form of multiposition switching device which is hereinafter referred to by the prefix word "traversing" includes a set of wipers or contact arms which are caused to travel to take up any of several positions and by engagement with or operation of a set of contacts in the position taken up perform the desired selection.

Another form of multiposition switching device which is hereinafter referred to by the prefix word "static" includes a plurality of operative elements located in various positions which are themselves selected in accordance with the selective action desired such as a set of relays or a crossbar switch the magnets of which are selected in accordance with the connection to be set up or a set of thermionic valves the grids of which are selected in accordance with the connection to be set up and the like. It is to be noted that while usually the components of a multiposition switching device form a unit assembly this is not essential in the case of a static multiposition switching device which includes a plurality of similar components where the linkage between components may be by electric conductors.

Multiposition switching devices are used for various purposes, such as the setting up of a connection under control of a calling party to a desired destination, the finding of a line or other equipment in a particular condition. For instance, in telephone systems it might be the finding of an idle or calling equipment; in systems for supervising or controlling the position of devices at a distance the purpose might be the signalling of the condition of such devices.

One object of the present invention is to provide simple means for ascertaining the condition of any equipment of a group such as a group of lines or switches without the use of a hunting device preferably over a single lead or circuit.

Such hunting devices in traversing multiposition switching devices took the form of an automatic movement of the travelling arms or wipers until an idle equipment was found. In static multiposition switching devices they took the form of an automatic operation in succession of relays or magnets of a group.

A further object of the invention particularly applicable to telecommunication systems employing static multiposition switching devices is to provide means for ascertaining from a plurality of groups of equipment whether corresponding equipments of such groups are in the same condition e. g. are idle. This is of particular value where it is desired to know the route over which a connection is to be set up before effecting the operation of the switch or switches which establish the connection.

According to one feature of the invention a cyclically operated multiposition switching device is adapted to connect a potential at distinctive instants of time in a cycle to each of a plurality of conductors, each of which conductors is associated with a separate equipment of a group, said equipments of a group being adapted when in a particular condition to connect the conductors with which they are associated to a common conductor whereby the conditions of the equipment in said group can be ascertained.

According to a further feature of the invention a cyclically operated multiposition switching device is adapted to make circuit changes at different instants of time in a cycle with respect to each of a number of conductors and an equipment or equipments of a group when in a particular condition is or are adapted to render the circuit changes produced in said leads which characterise the equipments in said condition effective to cause a distinctive operation of a static multiposition switching device.

A cyclically operated multiposition switching device is a multiposition switching device in which the operative elements are controlled cyclically to cause the successive selection by the operative elements of the devices corresponding to the different selective positions. Such a cyclically operated multiposition switching device may conveniently be a series of contact sets controlled by a motor driven cam device or by magnets so as to be operated successively.

According to a further feature of the invention one of a plurality of conductors each common to a group of equipments and to each of which potentials are applied characterising the condition of the equipments of the group to which it is common at instants in a cycle which differ for each equipment in a group is adapted to be selected by a multiposition switching device and to control through said device the registering or recording of the conditions of one or more equipments of the group selected.

According to a further feature of the invention a plurality of conductors each common to a separate group of equipments and to each of which potentials characterising the condition of the equipments of the group to which it is common are applied intermittently in a cycle are adapted jointly to exert a control on a static multiposition switching device whereby only one or more of those operative elements are caused to respond which characterise corresponding equipments in each group in the same predetermined relative position.

This latter feature is of particular service where the equipments of the different groups of equipment are used for setting up connection and it is desired to first determine which equipments in each group are idle, so that a connection may be set up over such equipments. A subsidiary feature is to cause a selected set of idle equipments to be marked busy until the equipments are actually seized to establish the connection.

Further subsidiary features of the invention concern the provision of means for preventing further control of the static multiposition switching device after a first equipment or set of equipments have been found in a predetermined condition, the provision of means for ensuring that the control of the static multiposition switching device shall start at a particular instant in a cycle so that the operative elements are tested in turn starting from the first.

The expression "equipment" is used herein to mean a line or multiposition switching device whether static or traversing or other device whose condition requires to be ascertained.

A set of leads to which potential is applied successively at the different instants of time in the cycle are provided for applying potential to a common lead. If more than one testing operation involving more than one common lead is to be performed at a time and if the leads over which potential is applied at different instants of time are used simultaneously for each such testing operation then according to a further feature of the invention means are included to prevent the connection of potential over the common leads to such simultaneously used leads at an instant of the cycle other than that which has been allocated to such leads. One simple method of effecting this is to include a uni-directional resistance such as a rectifier in each connection from such simultaneously used leads but other methods may be employed. For instance where the potential is supplied by a common set of interrupters, additional contacts may be provided on the interrupters to connect potential to a number of leads each of which may be used simultaneously for a number of testing operations.

A further feature of the invention relates to arrangements for finding the first idle route through a plurality of switching stages in response to the dialling of a plurality of digits, the switching devices of each stage having access to those in a succeeding stage. According to this feature of the invention a selecting device is provided for each switching stage and has access to groups of switching devices in the stage corresponding to different digital values, the setting of the selecting devices by dialled digits serving to connect a group of switching devices in each stage corresponding to said digits to the common lead whereby the selection of idle corresponding switching devices in the stages is ensured.

The invention will be better understood from the following description taken in conjunction with the accompanying drawing which shows an arrangement which is capable of many applications. It will, however, be understood by those versed in the art that certain components shown in the drawing are not essential for many of the applications and may be omitted.

The drawing illustrates in simple diagrammatic form the essential elements of a telecommunication exchange in which selector switches of any known type as used in telecommunication systems are represented by rectangles which enclose contacts to which the references TCA1 to TCA10 respectively are applied, the contacts are controlled by the selector switches either directly or by an associated relay in well known manner so as to be closed or open according as to whether a selector switch is in one condition, i. e., busy, or otherwise nonavailable for a connection or is in another condition, i. e., idle and available for setting up a connection. Selectors are conventionally illustrated in four vertical groups which may be given the references A, B, C, D corresponding to the distinguishing third character (A to D) in the contact references, while there are ten selectors in each vertical group which are distinguished by the fourth character 1-0 of said references. Selectors having contacts with the same fourth character are assumed to be connected in tandem to set up a particular connection, so that such connection can be set up over any of ten possible sets of selectors, each set being arranged for convenience in a horizontal row. There would evidently be in group B a number of selectors corresponding to possible values of the digit to which selectors in group A would respond and so on in groups C and D, but for convenience only those selectors in each group which are required to give access to a single subscriber are illustrated.

It will thus be seen that to set up a connection to such a subscriber it is necessary to determine which of the horizontally arranged sets of selectors can be used. It will be understood that although it forms no part of the present invention, the selectors of group A may have access to only a small group of calling subscribers, each such group, however, sharing selectors of group B with other similar groups of calling subscribers, as described in my copending and concurrently filed application Serial No. 69,720.

SDA, SDB, SDC and SDD serve to select from the various groups of selectors a set of four selectors by which the required connection can be set up, that is to say, a set in which a switch in each group is available. Selectors SDA-D could be operated in any known way, for instance manually or by impulses transmitted from a calling station, for instance selector SDA could be operated in response to the first digit of a called subscriber's number to select from a group of selectors corresponding to group B, a selector such as SDB which would respond to the second digit; SDB in turn would select from a further group of selectors corresponding to group C a selector such as SDC and would operate in accordance with the third digit and so on.

In the drawing I1 to I10 represents a series of cams arranged on a common shaft and rotated at a constant speed for instance by an electric motor. The cams are arranged to control their associated contacts in such a manner that earth is connected to leads L1 to L10 at successive instants in a cycle, the effect of the connection of earth to the leads being considered in detail subsequently. It will be understood that the shaft is rotated continuously by the electric motor through a number of successive cycles and the instants at which earth is connected to the leads L1–L10 are entirely independent of the instant of actuation of any control by which such earthing may become effective.

One application of the invention is to ascertain by registering on relays R1–R10 which of the switching devices or lines of a single group are in a given condition represented by the closure of the contacts TCA1–TCA10. Take group A by way of example and assume that of the contacts TCA1–10, TCA1, TCA3, TCA4, TCA9 and TCA10 are closed. Assuming also it is required to know which trunks of a particular group are idle, SDA would be first set to select the particular group. The lead LA is connected by the switching device SDA and uni-directional resistance URA to lead CL. At the same time battery over resistance R is connected to CL by any suitable means, the purpose of relays SR and FR being described later as they are not essential to this application.

It will be assumed that this connection of resistance battery to CL takes place at instant 5 in the cycle and also that switch SDA has been set on a contact for instance the fourth contact as shown while the remaining switches are disconnected. At instant 5, I5 connects earth to L5 and a circuit may be traced as follows: earth on I5, L5, right-hand winding and back contact of R5, lead CL, resistance R to battery. As URB, URC and URD are disconnected by switching devices SDB, SDC, SDD and URA which is connected by SDA to LA leads to an open contact, TCA5 which is fed with earth at instant 5 and to other contacts which whether open or closed are disconnected from earth at this instant, R5 will operate and lock operated to earth over its left-hand winding and "X" contact, and subsequently its right-hand winding is opened.

At the next instant 6, a circuit will be completed in similar manner for R6 and so on for R7 and R8 at instants 7 and 8 respectively. At instant 9, I9 connects earth to L9 which is extended not only to the right-hand winding of R9 but also through a rectifier URA9 to the operated contact TCA9, lead LA, SDA and URA to CL, thereby effectively short-circuiting the right-hand winding of R9 and preventing it operating at instant 9. At instant 10 due to the operation of TCA10, the right-hand winding of relay R10 will be similarly short-circuited. Ignoring the instant S associated with interrupter IS which is not required for the present example, the next instant in the cycle is instant 1 and as TCA1 is operated, the right-hand winding of R1 will be short-circuited. At instant 2 as TCA2 is open, relay R2 will operate in a similar manner to R5 while at instants 3 and 4, the right-hand windings of R3 and R4 respectively will be short-circuited.

At instant 5 no change takes place unless the connecting up of R5 at instant 5 of the previous cycle occurred too late to enable R5 to operate. In such a case the circuit for R5 is now re-established and the relay operates. Similarly no change takes place in subsequent instants unless other contacts of TCA1–10 are closed while the test is in being during the period between corresponding instants of the two cycles. It will thus be seen that when the complete cycle is finished, relays R3, R5, R6, R7, R8 will be operated corresponding to those switching devices or lines which do not have their TCA contacts closed and relays R1, R2, R4, R9, R10 will be unoperated corresponding to those switching devices or lines which do have their TCA contacts closed. It will thus be seen that while as previously mentioned the earthing of leads L1–L10 at successive instants in successive cycles is effected continuously, the actual earthing of the leads is rendered effective over a period which may be greater than that of a single cycle.

The switching device SDA may be a selector or selecting device and may be adapted to be set to connect up different leads corresponding to LA, each of which leads is adapted to indicate the idle, busy or other condition of a number of switching devices or lines of a group similar to group A.

Another application is to operate the first of the relays R1–R10 in numerical order which corresponds to the first of the switching devices or lines TCA1–10 also in numerical order which is in a given condition, for instance to determine the first idle line in a group. In this example use is made of start interrupter IS and of start relay SR and finish relay FR. Assume that the same contacts TCA1–10 are operated as before and also assume that the test is initiated at instant 5 as before. To initiate the test, contacts IC1 and IC2 are closed by any suitable means e. g. a key, contacts of a relay adapted to be operated when the test is required to be made, a switch contact or the like. Contact IC1 connects battery to relay SR whose other terminal is connected via lead LS to contacts which are connected to earth by IS at instant S only. Consequently at instant 5 there will be no circuit for relay SR, there will also be no circuit for the right-hand winding of relay R5 since the operating circuit for the right-hand windings of all the relays R1 to R10 is dependent upon battery through resistance R being connected up to CL and this can only take place when SR is operated. When, however, instant S is reached, relay SR operates and locks operated to earth on IC2 and also connects up battery through resistance R to CL. The next instant 1 results in the short-circuiting of the right-hand winding of R1 as previously described and at instant 2 relay R2 operates and locks operated over its left-hand winding in series with relay FR to earth on contact IC2. Consequently relay FR also operates and disconnects battery and resistance R from lead CL thereby preventing any other of the relays R1–R10 from being operated during the continued operation of IC1, IC2 and SDA. The result is therefore that R2 is operated indicating that the second switching device in group A is the first one idle.

If the test is being made with a view to taking into use the first idle switching device or line in group A and, as described above, the second switching device is taken into use, it is desirable that the second switching device should be immediately marked as busy even before its contact TCA2 is operated and this is effected by the right-hand contact of R2 which connects lead L2 to the right-hand side of URA and so connects earth to lead LA at the same moment as if TCA2 were closed.

Again it may not be required to determine the first idle switching device or line in numerical order as any idle switching device or line might serve the purpose in which case IC and SR may be omitted as long as battery and resistance R are connected through back contact of relay FR to CL. When a relay such as R5 responds, relay FR is operated in the locking circuit of R5 and the disconnection of resistance R results in the prevention of any other R relay being operated.

The above applications only concern a single group of switching devices or lines, but similar applications of the invention may be made to two, three, four or more groups of switching devices or lines. For instance TCA1–TCA10 might be one of a number of groups of selectors each group corresponding to a different value of the first digit of a called number. TCB1–TCB10 might be one of a number of groups of selectors, each group corresponding to the same value of first digit as group TCA1–10 and a different value of the second digit of a called number. Similarly TCC1–TCC10 might be one of a number of groups of selectors each group corresponding to the same value of the first digit as group TCA1–10 and and the same value of the second digit as group TCB1–10 but a different value of the third digit of a called number. Similarly TCD1–TCD10 might be one of a number of groups of selectors each group corresponding to the same value of the first digit as group TCA1–10, the same value of the second digit as group TCB1–10, the same value of the third digit as group TCC1–10 and a different value of the fourth digit of a called number. It will be understood that if the switches of group TCA1–10 have access to correspondingly numbered switches in group TCB1–10 and switches of group TCB1–10 have access to correspondingly numbered switches of group TCC1–10 and switches of group TCC1–10 have access to correspondingly numbered switches of group TCD1–10, then a connection could be set up to the same called number over any of the correspondingly numbered switches. Consequently if it was desired to ascertain if there were idle switches of the same numerical designation in each of the groups A, B, C and D it would be necessary to test all four groups of switches together. This can be done by connecting up the test lead LA, LB, LC, LD over selecting device SDA (e. g. corresponding to the first digit), over selecting device SDB (e. g. corresponding to first and second digits), over selecting device SDC (e. g. corresponding to first, second and third digits) and over selecting device SDD (e. g. corresponding to first, second, third and fourth digits) respectively and unidirectional resistances URA, URB, URC and URD respectively to common lead CL.

The application to be described will assume that it is desired to find the first idle route through the switching devices of group A, B, C and D of the routes numbered 1 to 10. Modifications of this application can readily be understood from what has been described with reference to a single group.

It will be assumed as before that—

In group A, TCA1, TCA3, TCA4, TCA9, TCA10 are operated
In group B, TCB1, TCB2 and TCB5 are operated
In group C, TCC1, TCC6 and TCC9 are operated
In group D, TCD1, TCD5 and TCD8 are operated then assuming IC1 and IC2 are operated at instant 5, battery through resistance R will be connected up at instant S when IS operates SR over lead LS, its right-hand winding to battery on IC1. SR locks operated and connects battery and resistance R over back contact of FR to common lead CL. At instant 1 when earth is connected over lead L1 to right-hand winding of relay R1 common lead CL is connected to earth over TCA1, LA, SDA, URA, as well as over TCB1, LB, SDB, URB and TCC1, LC, SDC, URC and TCD1, LD, SDD, URD so that R1 is short-circuited and cannot operate.

At instant 2 when earth is connected over lead L2 to right-hand winding of relay R2, common lead CL is connected to earth over TCB2, LB, SDB, URB and consequently R2 cannot operate.

At instant 3 when earth is connected over lead L3 to right-hand winding of relay R3 common lead CL is connected to earth over TCA3, LA, SDA, URA and consequently R3 cannot operate.

At instant 4 when earth is connected over lead L4 to right-hand winding of relay R4, common lead CL is connected to earth over TCA4, LA, SDA, URA and consequently R4 cannot operate.

At instant 5 when earth is connected over lead L5 to right-hand winding of relay R5, common lead CL is connected to earth over TCB5, LB, SDB, URB and over TCD5, LD, SDD, URD and consequently R5 cannot operate.

At instant 6 when earth is connected over lead L6 to right-hand winding of relay R6, common lead CL is connected to earth over TCC6, LC, SDC, URC and consequently R6 cannot operate.

At instant 7 when earth is connected over lead L7 to right-hand winding of relay R7, no earth connection is made to common lead CL either over LA, LB, LC or LD and consequently the circuit for R7 extends from the right-hand winding of relay R7 and its back contact, common lead CL, front contact of SR, back contact of FR resistance R to battery. R7 operates and at its "X" contact closes a locking circuit for its left-hand winding in series with relay FR.

Relay FR energises and disconnects battery and resistance R from common lead CL to prevent any other of the relays R1–R10 from operating. R7 at its right-hand contacts connects L7 to leads LA, LB, LC, LD through the unidirectional resistances and the selecting devices so that until the switching devices TCA7, TCB7 and TCD7 are definitely taken into use, they are indicated as if they were busy.

To restore to normal in any case all that is necessary is to open contacts IC1 and IC2 and a second testing operation can take place when once selecting devices SDA, SDB, SDC and SDD have been reset for another call.

It will be understood that the switches of the groups A, B, C and D are not necessarily switches which lead forwards like group and final selectors or uni-selectors but some or all of them may be switches which lead backwards as in finder switches. For instance a connection could be set up from a battery-feeding relay set over C and D to the called line and over B and A to the calling line. Other variants will readily occur to those versed in the art.

It will be noted that uni-directional resistors URA, URB, URC, URD are located between CL and the connections over SDA, SDB, SDC, SDD to lead LA, LB, LC, LD. This ensures that an earth on say LA at instant 5 will not reach any of the leads LB, LC or LD in a form to be effective on any other lead similar to CL which may be in use for a similar purpose to CL in another part of an exchange. Additional uni-directional resistors URA1–10, URB1–10, URC1–10, URD1–10 are shown between leads L1–L10 and contacts TCA1–10, TCB1–10, TCC1–10, TCD1–10 respectively to prevent an earth placed on one of the leads L1–L10 at a particular instant in a cycle being effective over another lead which is characterised by earth being placed on it at a different instant of a cycle which would of course occur if more than one of the contacts TCA1–10 for instance were operated together to establish connection with a common lead such as LA. Some such precaution is necessary where the cam contacts of I1–I10 are arranged to control a lead common to more than one test lead such as LA, LB, LC, LD.

Again uni-directional resistors URIA–URI0A, URIB–URI0B, URIC–URI0C, URID–URI0D are required in series with the extreme right-hand contacts of R1–R10 respectively for a similar purpose to that just described, as the contacts referred to serve the same purpose as the contacts TCA1–10, TCB1–10, TCC1–10, TCD1–10.

I claim:

1. A signalling circuit comprising a plurality of switching devices, a source of potential, an electro-responsive device having at least two terminals, continuously operated cyclic switching means for connecting one terminal of said source of potential to one contact of each switching device simultaneously at a predetermined instant in the cycle and for connecting the same terminal of said source of potential to one terminal of said electro-responsive device at said predetermined instant in the cycle, switching means for connecting another terminal of said source of potential to another terminal of said electro-responsive device, and selecting means for connecting another contact of each of a plurality of said switching devices with said other terminal of said electro-responsive device, whereby the electro-responsive device can only respond if none of the selected switching devices are in a particular condition.

2. A signalling circuit comprising a plurality of switching devices arranged in groups, a source of potential, an electro-responsive device individual to each group and having at least two terminals, continuously operated cyclic switching means for connecting one terminal of said source of potential to a contact of each switching device of a group at a predetermined instant distinctive of the group in successive cycles and for connecting said terminal of said source of potential to a terminal of the electro-responsive device of such group at said predetermined instant in successive cycles, switching means for connecting another terminal of said source of potential to another terminal of said electro-responsive device, and selecting means by which another contact of each switching device of a number of groups are connected to the electro-responsive devices over the same period of time, whereby an electro-responsive device can only respond if none of the selected switching devices is in a particular condition.

3. A signalling circuit as claimed in claim 2 in which unidirectional resistors are provided in series with each switching device to ensure that potential is applied in only one direction through a switching device.

4. A signalling circuit comprising an electro-responsive device, continuously operated cyclic means by which said electro-responsive device is enabled to be operated at a predetermined instant in successive cycles, first switching means to condition the cyclic means to operate said electro-responsive device to respond at said predetermined instant in successive cycles and further switching means to establish a shunt circuit about said electro-responsive device to enable said continuously operated cyclic means to become effective at said predetermined instant to prevent the operation of said electro-responsive device, whereby the operation of said electro-responsive device is made dependent upon the non operation of said further switching means.

5. A signalling circuit comprising a plurality of electro-responsive devices, continuously operated cyclic means by which the electro-responsive devices are each enabled to be operated at instants in successive cycles distinctive of each device, first switching means to condition the cyclic means to operate said electro-responsive devices to respond at the instants in successive cycles which are predetermined with respect to each device, and further switching means to establish a shunt circuit about individual ones of said electro-responsive devices to enable said continuously operated cyclic means to be effective in preventing the operation of said individual ones of said electro-responsive devices.

6. A signalling circuit as claimed in claim 5 in which an additional electro-responsive device having a control circuit dependent upon said first mentioned electro-responsive device is provided which operates immediately when one of said electro-responsive devices operates to prevent the operation of any other of said electro-responsive devices.

7. A signalling circuit comprising a plurality of electro-responsive devices each having at least two terminals, a source of potential, cyclic switching means for connecting one terminal of said source of potential to one terminal of each electro-responsive device at instants in successive cycles distinctive of said devices, switching means for connecting said terminal of said source of potential to second terminals of selected ones of said electro-responsive devices to prevent such devices from operating and further switching means for connecting another terminal of said source of potential to the second terminal of other of said electro-responsive devices to enable such devices to operate.

8. A signalling circuit comprising a plurality of electro-responsive devices each having at least two terminals, continuously operating cyclic switching means, a source of potential, a first common lead connected to one terminal of each of said electro-responsive devices, a plurality of switching devices, a second common lead to which one terminal of said first source of potential is connected by said cyclic switching means at instants in successive cycles distinctive of selected ones of said devices via any of said switching devices in operating condition, a plurality of leads each of which is connected to a second terminal of an electro-responsive device and to which said terminal of said source of potential is connected by said cyclic switching means at instants distinctive of the device to which they are connected, first switching means for connecting together said first and said second common leads, second switching means for connecting another terminal of said source of potential to said first common lead to enable an electro-responsive device to which said first terminal of said source of potential is connected only to said one terminal to be operated.

9. A signalling circuit comprising a first conductor, a second conductor, a third conductor, a continuously operated cyclic generator, a plurality of electro-responsive devices each having a plurality of terminals to one of which said first conductor is connected in common, a source of potential having a terminal thereof connected to said generator, a plurality of leads respectively extending from said continuously-operated cyclic generator to a second terminal of each of said devices, whereby one terminal of said source of potential is connected to said second terminal by the cyclic generator at instants in successive cycles which are distinctive of the electro-responsive devices to which the lead is extended, a first plurality of switching devices associated with said second conductor, each switching device corresponding to one of said electro-responsive devices, and effective in conjunction with said cyclic generator to connect said terminal of said source of potential to said second conductor at instants in successive cycles characterising the electro-responsive device with which the switching device is associated, a second plurality of switching devices associated with said third conductor, each switching device of the second plurality corresponding to one of said electro-responsive devices, and effective in conjunction with said cyclic generator to connect said terminal of said source of potential to said third conductor at instants in successive cycles characterising the electro-responsive device with which the such switching device is associated, an auxiliary unidirectional resistor, a first selecting means by which said first conductor is connected through said first unidirectional resistor and a selected contact of the selecting means to said second conductor, a second unidirectional resistor, a second selecting means by which said first conductor is connected through said second unidirectional resistor and a selected contact of such selecting means to said third conductor and a further switching device by which the other terminal of said source of potential is connected to said first conductor whereby that electro-responsive device is operated first which does not have said first mentioned terminal of said source of potential connected to the first terminal thereof by switching means of said first and second plurality over said second and third conductors and whose instant of response in successive cycles follows first after the operation of said further switching device.

10. A signalling circuit comprising a plurality of conductors, a source of potential, continuously operated cyclic switching means for connecting said source of potential to each of said conductors in successive cycles at instants of time distinctive of such conductors, a plurality of electro-responsive devices having at least two terminals, said conductors being connected to corresponding first terminals of said device so that each such connection is distinctive for each device, a further conductor connected in common to corresponding second terminals of said electro-responsive devices and switching means by which an operating circuit including both terminals of said source of potential for each electro-responsive device is prepared, an additional conductor, a set of switching devices each of which connects one of said plurality of conductors to said additional conductor and connecting means by which said additional conductor is connected to said further conductor so that those electro-responsive devices coresponding to operating ones of said switching devices are prevented from operating at the instants at which potential is applied to the first terminals on such electro-responsive devices.

RICHARD MERCER.

References Cited in the file of this patent
UNITED STATES PATENTS

| Number | Name | Date |
|---|---|---|
| 1,604,550 | Deakin | Oct. 26, 1926 |
| 2,211,020 | Marrison | Aug. 13, 1940 |
| 2,291,752 | Parker | Aug. 4, 1942 |
| 2,379,221 | Espenschied | June 26, 1945 |
| 2,532,718 | Hecht | Dec. 5, 1950 |